United States Patent
Shakya et al.

(10) Patent No.: US 10,028,171 B2
(45) Date of Patent: Jul. 17, 2018

(54) BANDWIDTH SELECTION PROCEDURE FOR STA OPERATING IN TVWS BAND

(71) Applicant: MediaTek Singapore Pte. Ltd., Singapore (SG)

(72) Inventors: Amit Kumar Shakya, New Delhi (IN); Raghav Monga, Chandigarh (IN); Raju Kumar Singh, Uttar Pradesh (IN)

(73) Assignee: MediaTek Singapore Pte. Ltd., Singapore (SG)

( * ) Notice: Subject to any disclaimer, the term of this patent is extended or adjusted under 35 U.S.C. 154(b) by 130 days.

(21) Appl. No.: 15/076,672

(22) Filed: Mar. 22, 2016

(65) Prior Publication Data

US 2017/0230978 A1 Aug. 10, 2017

(30) Foreign Application Priority Data

Feb. 5, 2016 (IN) .............................. 201631004223

(51) Int. Cl.
*H04W 72/04* (2009.01)
*H04W 28/20* (2009.01)

(52) U.S. Cl.
CPC .................................. *H04W 28/20* (2013.01)

(58) Field of Classification Search
CPC .......................... H04W 28/20; H04W 72/0453
See application file for complete search history.

(56) References Cited

U.S. PATENT DOCUMENTS

| | | | | |
|---|---|---|---|---|
| 2013/0016670 | A1* | 1/2013 | Shellhammer | H04W 16/14 370/329 |
| 2014/0243009 | A1* | 8/2014 | Nekovee | H04W 16/14 455/454 |
| 2015/0098474 | A1* | 4/2015 | Ganesan | H04L 12/467 370/395.53 |
| 2015/0139115 | A1* | 5/2015 | Seok | H04W 72/0453 370/329 |
| 2015/0223182 | A1* | 8/2015 | Kim | H04W 52/146 370/329 |
| 2015/0256314 | A1* | 9/2015 | Gauvreau | H04L 5/0053 370/329 |
| 2016/0044648 | A1* | 2/2016 | Gao | H04J 3/0641 370/336 |
| 2016/0044685 | A1* | 2/2016 | Nekovee | H04W 16/14 370/329 |

* cited by examiner

*Primary Examiner* — Brian D Nguyen
(74) *Attorney, Agent, or Firm* — Winston Hsu

(57) ABSTRACT

A method for selecting an optimized bandwidth for a geo-location controlled (GDC) station (STA) which does not have location determining capability includes: analyzing first statistical data indicating a bandwidth which is widely deployed across regions; and selecting that bandwidth as the optimized bandwidth. The method further includes checking a configuration file of the GDC STA to determine country information of where the GDC STA was sold; and selecting either a bandwidth corresponding to the country or selecting the bandwidth which is most widely deployed across regions according to the first statistical data as the optimized bandwidth.

8 Claims, 2 Drawing Sheets

BANDWIDTH SELECTION PROCEDURE FOR STA OPERATING IN TVWS BAND

BACKGROUND

Television channels broadcast signals on Very High Frequency (VHF) and Ultra High Frequency (UHF) bands. In order to prevent interference between adjacent channels within these frequency bands, white spaces are created which are areas where no television signals will be transmitted. On Nov. 4, 2008, the Federal Communications Commission (FCC) of America licensed the use of white spaces for signal transmission by private individuals. The recent switch from analog television to digital has further freed up large amounts of space on the Television White Space (TVWS) spectrum, with the FCC stopping analog transmissions on Jun. 12, 2009. Current regulations in North America allow the use of signals transmitted from portable devices on the frequency band occupied by television channels 21~51, with the proviso that these signals must not interfere with transmissions from television stations and wireless microphones.

The three main issues confronting the use of the TVWS band for signal transmission are: spatial variation; spectrum fragmentation; and temporal variation. Spatial variation is due to the fact that the availability of channels on the TVWS spectrum depends on location. It cannot be assumed that a particular channel which is free in a first location is also free in a second location. Temporal variation means that a channel may only be free for a limited amount of time. Just as it cannot be assumed that a same channel is free in a first location and a second location, it cannot be assumed that a same channel is free at a first time and a second time. If the channel becomes unavailable, reconfiguration must be performed in order to continue transmissions. Finally, spectrum fragmentation refers to the issue wherein different regulatory bodies use different bandwidths for TVWS band operation. For example, in the United States, Taiwan, South Korea and Japan, individual channels occupy a bandwidth of 6 MHz; in Italy, Australia and New Zealand, individual channels occupy a bandwidth of 7 MHz and in the United Kingdom, France and China, individual channels occupy a bandwidth of 8 MHz. These issues mean that it is necessary to have access to information detailing which channels are currently available, for how long the channels are available, and bandwidth information for the particular region, before signal transmission can begin.

Many devices which operate on the TVWS band do not have the ability to determine their own location information and therefore cannot select a particular bandwidth for scanning. This means that they must scan on all bandwidths in order to locate access point (AP) beacons. After a first AP beacon is received, the corresponding bandwidth of the beacon is used to determine in which area the GDC dependent STA is located. This method is inefficient and can take up a considerable amount of time and resources.

SUMMARY

It is therefore an objective of the present invention to provide an optimized method for bandwidth selection to increase the probability of finding an AP in a first scan.

A method for selecting an optimized bandwidth for a geo-location controlled (GDC) station (STA) comprises: analyzing first statistical data to determine a bandwidth; selecting the bandwidth as the optimized bandwidth; and using the optimized bandwidth to communicate with an access point. The GSC STA can be a station that does not have location determining capability.

The method further comprises: checking a configuration file of the GDC STA to determine country information of where the GDC STA was sold; and selecting either a bandwidth corresponding to the country or selecting the bandwidth which is most widely deployed according to the first statistical data as the optimized bandwidth, wherein when there is no information stored in the configuration file, directly selecting the bandwidth which is most widely deployed according to the first statistical data as the optimized bandwidth.

The method still further comprises: in a next scanning procedure, selecting the optimized bandwidth as an initial bandwidth for the next scanning procedure, wherein the GDC STA further examines second statistical data of the GDC STA to determine how many consecutive times the initial bandwidth should be scanned, and selecting a different bandwidth from the initial bandwidth according to the statistical data, and the second statistical information comprises information relating to how many times an AP has recently been found on different bandwidths.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
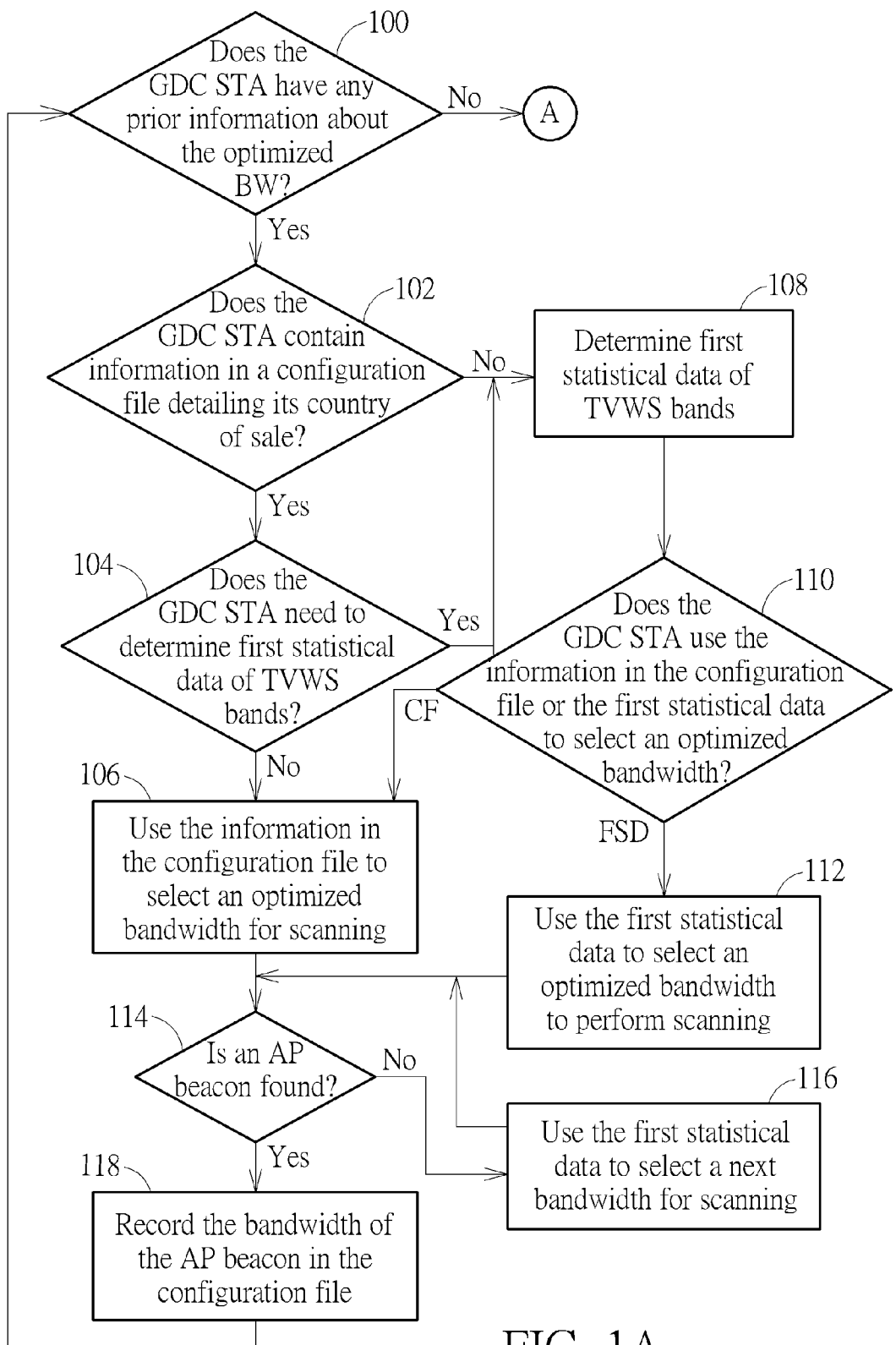
FIG. 1A is a flowchart of a method for selecting an optimized bandwidth according to an exemplary embodiment of the present invention.

The present invention concerns devices which operate on the TVWS band and do not have the ability to determine their own location information. These devices are herein referred to as geo-location dependent controlled (GDC) dependent stations (STA). It is noted that these devices may be portable, i.e. do not have a fixed location, and therefore it cannot be assumed that a previously used bandwidth can be used for a next scanning procedure. Further, as detailed in the background, TVWS has temporal and spatial variation as well as spectrum fragmentation, and therefore each GDC STA must first scan for AP beacons before beginning transmissions in order to confirm which channels on the white spaces are available.

The present invention therefore provides a number of methods for selecting a scanning bandwidth in a more efficient manner. During a first operation of a GDC STA, the GDC STA will have no information related to scanning operations. The present invention provides two methods for selecting an optimized bandwidth for initial scanning, e.g. during a boot-up procedure for the first time or during a system reset. The two methods can be performed separately or in combination, using some type of decision logic to determine which information to use when selecting the optimized bandwidth. This is not a limitation of the present invention and can be readily implemented by one skilled in the art.

The following will detail both optimized bandwidth selection processes. This process is for when no previous information about bandwidths is available to the GDC dependent STA; for example, during a boot-up operation for the first time the GDC dependent STA is being operated. In this case, the GDC dependent STA only knows that it must scan for another STA on the TVWS band, but this band could be 6 MHz, 7 MHz or 8 MHz, depending on whether the GDC dependent STA is located in North America, Europe or Asia.

Rather than scanning all bandwidths to search for AP beacons, the optimization procedure is used to quickly determine a most likely bandwidth. In a first embodiment, the GDC dependent STA will use statistical data of TVWS bands to determine which bandwidths are used in the most regions. The bandwidth which is used in the most regions is selected as the first bandwidth for scanning, followed by a bandwidth which is used in the next most regions, etc.

In a second embodiment of the optimization procedure, a value can be set within the GDC dependent STA according to the country the GDC STA is produced in. This is because it is likely that a user will both purchase and operate a GDC dependent STA in the same country. When the GDC dependent STA starts a scanning procedure where there is no prior bandwidth information, the bandwidth corresponding to the country of sale will be selected as an optimized bandwidth. If, for example, the GDC dependent STA is bought in the United States, this information will be stored in a configuration file of the STA, and during boot-up, the 6 MHz bandwidth will be selected as a first scanning bandwidth.

Using the above methods for selecting an optimized bandwidth, it is likely that an AP will be found quickly during an initial scan. The configuration file of the GDC dependent STA is non-volatile and can therefore store the bandwidth the AP is found on for subsequent procedures. When an AP is found on a different bandwidth from the optimized bandwidth, this information can be updated in the configuration file, and further used to generate statistical information related to how many APs have been found in subsequent scanning procedures and on which bandwidths.

The above methods are illustrated in FIG. 1A, steps 100-118, which are detailed below.

Step 100: Does the GDC STA have any prior information about the optimized BW? If yes, go to Step 102; if no, go to Step 120;

Step 102: Does the GDC STA contain information in a configuration file detailing its country of sale? If yes, go to Step 104; if no, go to Step 108;

Step 104: Does the GDC STA need to determine first statistical data of TVWS bands? If no, go to Step 106; if yes, go to Step 108;

Step 106: Use the information in the configuration file to select an optimized bandwidth for scanning;

Step 108: Determine first statistical data of TVWS bands;

Step 110: Does the GDC STA use the information in the configuration file or the first statistical data to select an optimized bandwidth? If the information in the configuration file (CF) is used, go to Step 106; if the first statistical data (FSD) is used, go to Step 112;

Step 112: Use the first statistical data to select an optimized bandwidth to perform scanning;

Step 114: Is an AP beacon found? If yes, go to Step 118; if no, go to Step 116:

Step 116: Use the first statistical data to select a next bandwidth for scanning; return to Step 114;

Step 118: Record the bandwidth of the AP beacon in the configuration file and go back to Step 100;

As detailed above, once an AP beacon is located, the corresponding bandwidth will be recorded in the configuration file. This information can be used for subsequent scanning procedures, detailed herein as determining a prioritized bandwidth. In this case, the last-used bandwidth information as stored in the configuration file will be selected for a next scan. The GDC STA also maintains the statistical information related to how many APs have been found in subsequent scanning procedures and on which bandwidths.

If no AP is found on the prioritized bandwidth, the statistical information is used to select a next bandwidth for further scanning, or to determine how many times the prioritized bandwidth has to be consecutively scanned before selecting a next bandwidth.

Figure 1B:
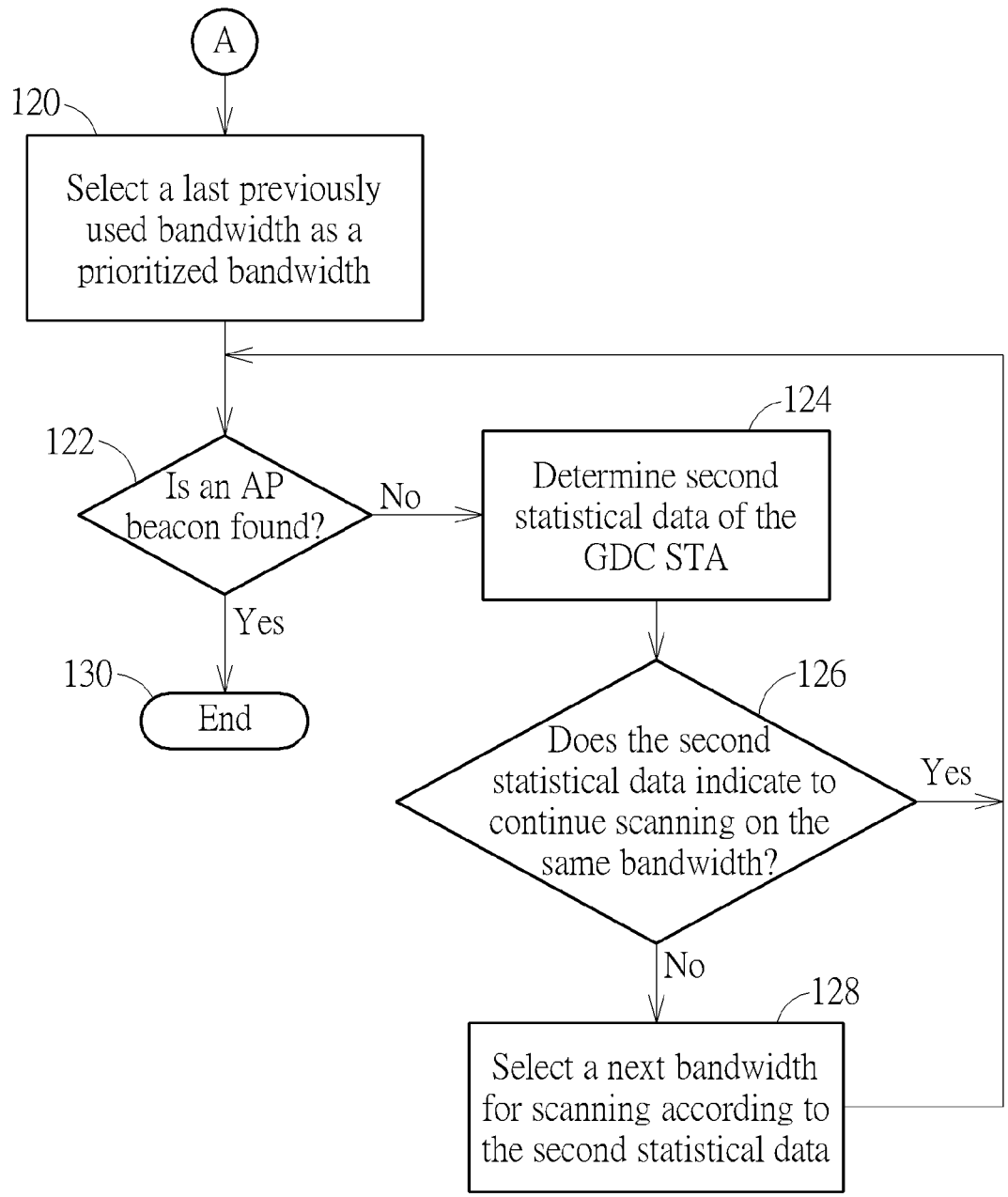
FIG. 1B is a flowchart of a method for selecting a prioritized bandwidth according to an exemplary embodiment of the present invention.

The above is illustrated in FIG. 1B, steps 120-130, which are described below.

Step 120: Select a last previously used bandwidth as a prioritized bandwidth;

Step 122: Is an AP beacon found? If yes, go to Step 130; if no, go to Step 124;

Step 124: Determine second statistical data of the GDC STA;

Step 126: Does the second statistical data indicate to continue scanning on the same bandwidth? If yes, go back to Step 122; if no, go to Step 128;

Step 128: Select a next bandwidth for scanning according to the second statistical data; go back to Step 122;

Step 130: End.

From the above, even when a GDC STA does not have the ability to determine its location or cannot use location information to contact with a geo-location database, the scanning procedure can still be simplified.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for selecting an optimized bandwidth for a geo-location controlled (GDC) station (STA), the method comprising:
    analyzing first statistical data to determine a bandwidth;
    checking a configuration file of the GDC STA to determine country information of where the GDC STA was sold;
    when there is no information stored in the configuration file, selecting a bandwidth which is widely deployed across regions according to the first statistical data as the optimized bandwidth, and when there is information stored in the configuration file, selecting either a bandwidth corresponding to the country or selecting the bandwidth which is widely deployed across regions according to the first statistical data as the optimized bandwidth; and
    using the optimized bandwidth to communicate with an access point.

2. The method of claim 1, wherein in a next scanning procedure, selecting the optimized bandwidth as an initial bandwidth for the next scanning procedure.

3. The method of claim 2, wherein the GDC STA further examines second statistical data of the GDC STA to determine how many consecutive times the initial bandwidth should be scanned, and selecting a different bandwidth from the initial bandwidth according to the second statistical data.

4. The method of claim 1, wherein the information is stored in a configuration file by a manufacturer of the GDC STA.

5. The method of claim 1, wherein the GDC STA has no prior information related to a previous bandwidth on which the GDC STA has performed a scanning procedure.

6. The method of claim 1, wherein the bandwidth is in a Television White Space (TVWS) spectrum.

7. The method of claim 1, wherein the geo-location controlled (GDC) station (STA) does not have location determining capability.

8. A method for selecting an optimized bandwidth for a geo-location controlled (GDC) station (STA), the method comprising:
- analyzing first statistical data to determine a bandwidth, wherein the first statistical information comprises information relating to a number of times an AP has been found on all available bandwidths during a predetermined time period;
- selecting the bandwidth as the optimized bandwidth; and
- using the optimized bandwidth to communicate with an access point.

* * * * *